May 3, 1966 M. J. KJOS 3,249,314

TAPE REEL

Filed Aug. 20, 1964 2 Sheets-Sheet 1

INVENTOR
MAGNE JARLE KJOS
BY
Christie, Parker & Hale
ATTORNEYS

May 3, 1966 M. J. KJOS 3,249,314

TAPE REEL

Filed Aug. 20, 1964 2 Sheets-Sheet 2

INVENTOR
MAGNE JARLE KJOS

BY Christie, Parker & Hale
ATTORNEYS

United States Patent Office 3,249,314

Patented May 3, 1966

3,249,314
TAPE REEL

Magne Jarle Kjos, Duarte, Calif., assignor to Burroughs Corporation, Detroit, Mich., a corporation of Michigan Filed Aug. 20, 1964, Ser. No. 390,912
9 Claims. (Cl. 242—68.3)

This invention relates to tape reels which permit rolled-up material on the reel to be removed as a roll without unwinding the material from the reel.

It is conventional in the industry today to use a two-flange reel for supporting rolls of magnetic tape, punched paper tape, and the like for storing the tape either upon a tape transport mechanism or in storage areas. These conventional reels generally have a hub and two flanges extending from the hub in spaced relation between which the coiled tape is stored. To remove the tape from the conventional reel, the tape must be unwound in reverse order of the winding operation.

With the advancing art in the data processing field, there is a need for tape reels which allow the tape to be removed as a roll. One need for such a reel is in the data handling and processing field in which data which is present on a roll of tape may be reviewed or processed into another usable form of intelligence. It is axiomatic that the first data recorded is disposed on the tape closest to the reel hub and the later recorded data is on the tape closer to the periphery of the tape roll. In order to read or interpret the data which is initially placed upon the reel, it would be necessary to remove the tape from the reel in the conventional manner by unwinding the tape progressively and rewinding it upon another reel. This winding and unwinding procedure is undesirable, and is eliminated in part by a reel which allows the removal of the tape from the reel as a roll.

Heretofore, some two-flange reels having a removable front flange and a plurality of tapered pins thereon have been used to allow the tape to be removed from the reel as a unit. Other existing constructions include a removable flange, spring clips, and/or flexible or tapered hubs of various design which allow the tape to be removed in a manner as set forth above. Problems have existed in using these known types of tape reels which severely limit the applications of the reels on conventional data processing equipment. For instance, the tape would not stay solidly attached to the reel hub during winding, and the torque applied to these reels is also quite limited. Average operating conditions for the use of such reels would be in the nature of tape movement at 100 or above inches per second with torques up to 15 pound-inches, which are not tolerated on these known two-flange tape reels.

The tape reel of this invention has an expanded and a collapsed position. In the expanded position, the reel firmly supports the tape, and also allows torques of 15 pound-inches to be applied to the tape while moving the tape at 100 or above inches per second. In the collapsed positions, the tape may easily be removed as a roll from the reel.

The present invention eliminates many of the undesirable features and disadvantages of the known tape reels especially adapted for the removal of tape from the reel as a roll. An important advantage of my invention is that the reel may be rapidly operated in either direction up to and exceeding 100″ per second. The structure of this reel allows the tape to be easily attached to the reel and easily removed without complicated manipulation.

A feature of my invention relates to a reel having a solid hub that has both an expanded and a collapsed position which allows tape to be removed from the reel as a complete roll. This solid hub allows the tape to be solidly attached and permits a single flange to be used on the reel.

One aspect of my invention extends to a reel having a rotatable hub and an expandable sleeve mounted on the hub, being movable between an expanded position and a collapsed position.

Other features and advantages will become apparent after considering the accompanying description and the following drawings, in which.

Figure 1:
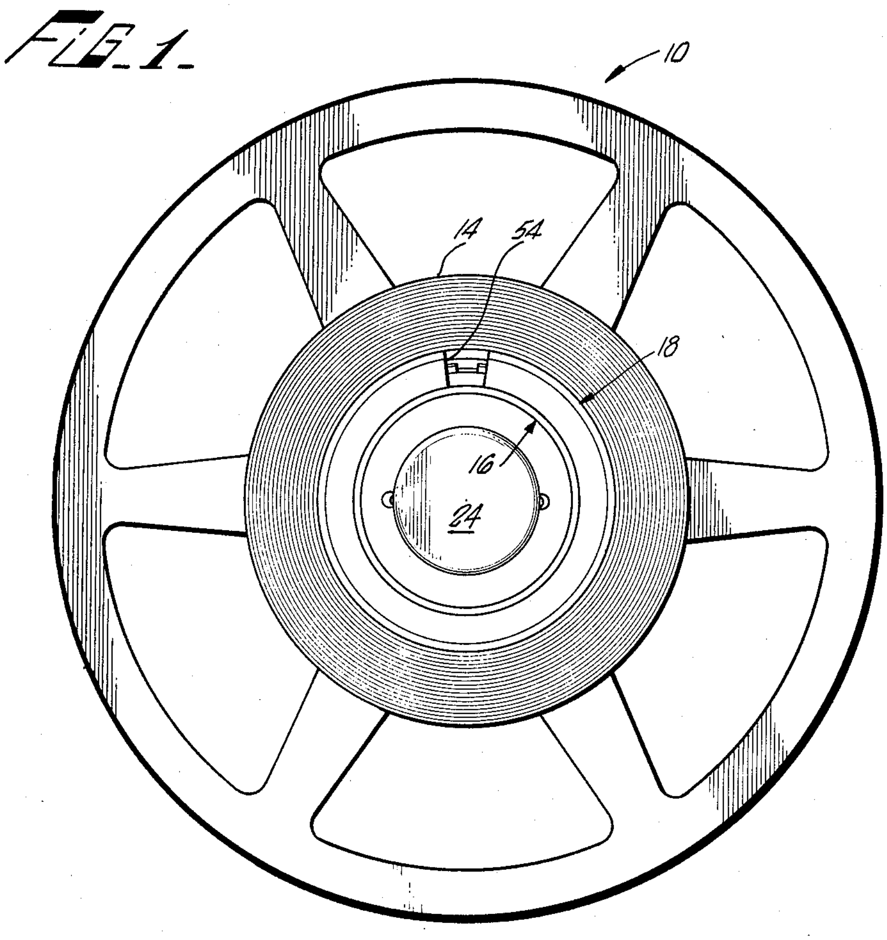
FIG. 1 is a front elevation of a reel constructed according to the present invention.

Referring now to all the figures, a tape reel 10 constructed according to the present invention is mounted upon a rotatable tape transport 12 and carries a roll of tape 14 wrapped around it. The reel includes a hub 16, an expandable annular split sleeve 18, and a tape supporting flange 20.

The hub 16 includes an opening 22 that is large enough to receive a spindle 24 extending from the tape transport device 12. A pair of resiliently biased balls 26 and 28 extend outwardly from the spindle 24 and respectively engage a pair of tapered grooves 32 and 34. The biased balls 26 and 28 resiliently retain the reel 10 upon the spindle 24 and urge the reel 10 against the tape transport device 12. The outer surface of the hub 16 is in the form of a truncated cone 36 terminating in an outwardly extending flange 38 integrally formed on the smaller end of the hub 16. An annular tapered groove 40 is disposed in the external surface of the cone 36.

Figure 2:
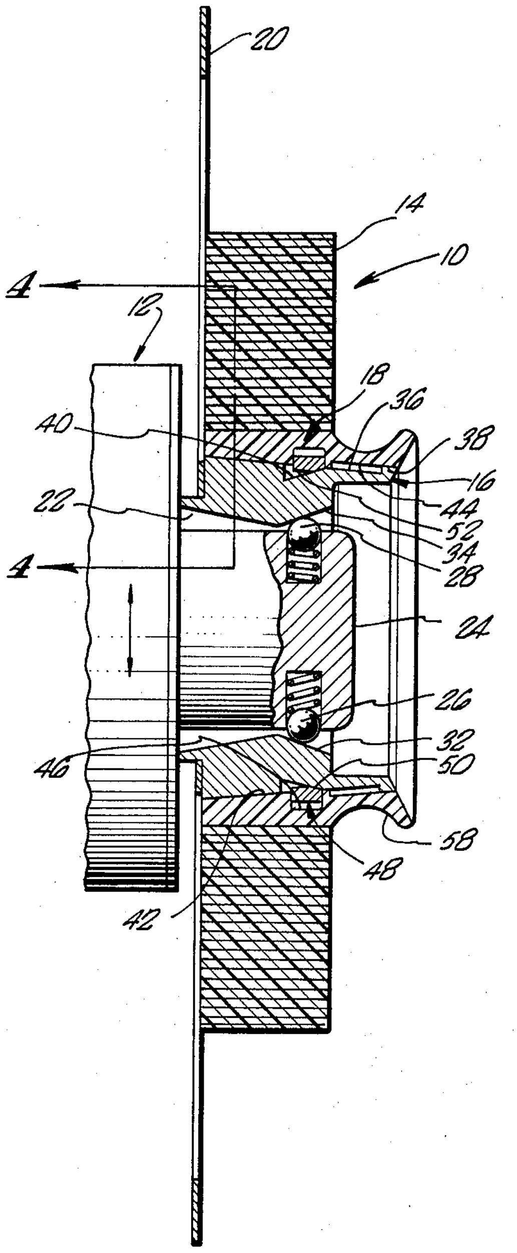
FIG. 2 is a typical cross-section of the reel illustrated in FIG. 1 and shown in the expanded position having a tape roll mounted thereon.
Figure 3:
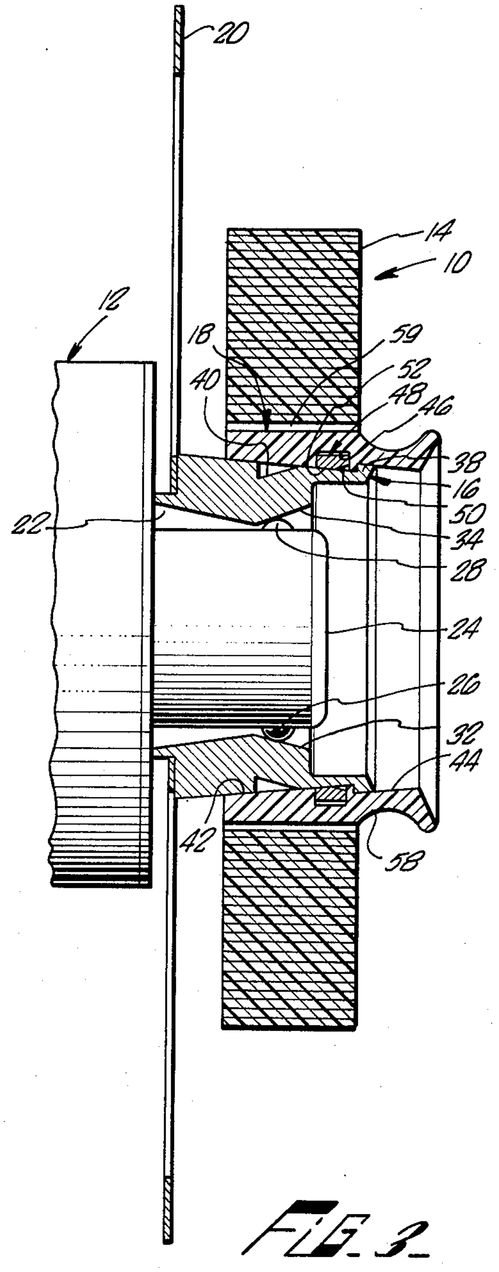
FIG. 3 is a typical cross-section of the reel illustrated in FIGS. 1 and 2 with the sleeve shown in the collapsed position.

The annular split sleeve 18 includes an opening 42 which is tapered at an angle of 5° with respect to its axis. The taper of the opening 42 matches the exterior surface of the cone 36, and allows the sleeve 18 to be slid axially of the hub 16 to expand the sleeve from a collapsed position, as shown in FIG. 3, to an expanded position, as shown in FIG. 2. The taper of the sleeve 18 and the cone 36 are such that the outer diameter of the sleeve 18 is reduced when it is slid axially to the right thereby forming a gap 59 between the tape 14 and the sleeve 18. A step 44 is formed in the sleeve opening 42 which is continuously aligned with the flange 38 formed on the hub 16, and the alignment of the step with the flange prevents the removal of the sleeve from the hub when the sleeve is in the collapsed positon, as illustrated in FIG. 3.

A continuous annular groove 46 is formed in the opening 42 of the sleeve 18 and is of such a size to permit an expandable spring clip 48 to be housed therein, as shown in FIGS. 2 and 3. The clip 48 is split to allow expansion and is preferably formed from a metallic or plastic material which allows expansion upon the application of stress. The clip 48 has a first tapered surface 50 which is so shaped as to mate with the tapered groove 40 formed in the hub 16, as shown in FIG. 2. A second tapered surface 52 formed on the clip 48 mates with the cone 36 formed on the hub 16 as shown on FIG. 3 and aids in expanding or contracting the clip 48 as the sleeve is moved between its collapsed position and expanded position. The clip 48 acts as a retaining means for the sleeve upon the hub 16 when the sleeve is in its expanded position, as shown in FIG. 2. In this positon the expandable clip 48 extends within the groove 40 of the hub 16 and tends to prevent movement of the sleeve 18 from its expanded position to its contracted position.

Figure 4:
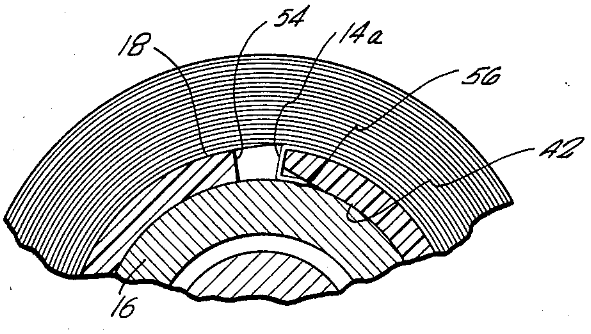
FIG. 4 is a fragmentary cross-sectional view taken on line 4—4 of FIG. 2 to show the cavity between the sleeve and hub for locking one end of the tape within the reel.

The sleeve 18 has a split 54 which extends along its entire length. A cavity in the form of a flare 56 is formed in the sleeve opening 42, as shown in FIG. 4. One end 14A of the tape 14 is inserted within the cavity 56 during the installation of the tape upon the reel 10. Cavity 56 becomes progressively smaller as the sleeve is shifted to its expanded position to thereby lock the tape upon the reel. The reel may be operated in either direction while a great amount of torque may be applied to the reel when reeling the tape at speeds up to 100 and above inches per second.

It is to be understood that in the collapsed position, the sleeve 18 is under no or light tension and in the expanded position the sleeve is under tension upon the hub thereby increasing the size of its periphery and expanding the gap at the split.

The operation of the reel 10 according to the present invention is as follows. One end of the tape 14 is inserted within the cavity 56 with the sleeve in the collapsed position. After shifting the sleeve 18 to the expanded position, the tape is progressively wound and unwound upon the reel by the tape transport device 12 in a conventional manner. At the completion of the reeling operation, the entire roll of tape 14 is removed from the reel by sliding the sleeve 18 away from the flange 20 by a person placing his fingers within an annular exterior gripping groove 58 in the outer end of the sleeve and pulling the sleeve 18 into its collapsed position, as shown in FIG. 3. The sleeve outer diameter is reduced slightly, as shown in FIG. 3, which allows the gap 59 to form between the tape 14 and the sleeve 18. The tape end clamped between the sleeve and the hub is freed when the sleeve is moved to the collapsed position, and the tape is removed as a roll and may be reinserted as a roll.

What is claimed is:

1. A reel for holding a roll of material, the reel comprising:
- a rotatable hub having an axis of rotation,
- an expanable sleeve mounted on the hub and movable along the axis of the hub between an expanded position and a collapsed position,
- means for holding the sleeve on the hub in an expanded position so the sleeve makes a snug fit inside the roll of material, and
- means for holding the sleeve in the collapsed position so the sleeve makes a loose fit within the roll of material so the roll can be slipped off the sleeve.

2. A reel for holding a roll of material, the reel comprising:
- a rotatable hub having an axis of rotation,
- an expandable sleeve mounted on the hub and movable along the axis of the hub between an expanded position and a collapsed position,
- the sleeve in its expanded position making a snug fit with the roll of material and in its collapsed position making a loose fit with the roll of material so the roll can be slipped off the sleeve, and
- means coupled to the sleeve and the hub for retaining the sleeve in one of its positions.

3. A reel for holding a roll of material, the reel comprising:
- a rotatable hub having an axis of rotation,
- an expandable sleeve mounted on the hub and movable along the axis of the hub between an expanded position and a collapsed position,
- means for holding the sleeve on the hub in an expanded position so the sleeve makes a snug fit inside the roll of material,
- means for holding the sleeve in the collapsed position so the sleeve makes a loose fit within the roll of material so the roll can be slipped off the sleeve, and
- means formed on the sleeve for limiting the extent of the axial movement thereof thereby preventing the removal of the sleeve from the hub.

4. A reel for holding a roll of material, the reel comprising:

- a rotatable hub having an axis of rotation,
- an expandable sleeve mounted on the hub and movable along the axis of the hub between an expanded position and a collapsed position,
- the sleeve in its expanded position making a snug fit with the roll of material and in its collapsed position making a loose fit with the roll of material so the roll can be slipped off the sleeve,
- the hub having a tapered surface,
- the sleeve having a tapered surface mating with the hub tapered surface thereby causing said sleeve to change between said expanded positon and said collapsed position with movement along the axis thereof, and
- means coupled to the sleeve and the hub for retaining the sleeve in one of its positions.

5. A reel for holding a roll of material, the reel comprising:
- a rotatable hub,
- an expandable sleeve mounted on the hub and movable between an expanded position and a collapsed position, and
- means for holding the sleeve on the hub in an expanded position so the sleeve makes a snug fit inside the roll of material,
- the sleeve having a split in at least one place to allow the sleeve to expand, and
- the sleeve having a tape receiving cavity formed adjacent the sleeve split to permit one end of the material to be secured to the sleeve by insertion into the sleeve cavity.

6. A reel for holding a roll of material, the reel comprising:
- a rotatable hub,
- an expandable split sleeve slidably disposed over the hub and movable between an expanded position and a collapsed position,
- the hub having an outwardly extending tapered surface and an outwardly extending flange,
- the sleeve having a tapered surface mating with the hub tapered surface and including a step aligned with the hub flange for holding the sleeve in the collapsed position so the sleeve makes a loose fit within the roll of material so the roll can be slipped off the sleeve,
- an expandable spring clip,
- the sleeve having a groove formed in its tapered surface with the spring clip extending therein, and
- the hub having a groove and the spring clip engaging the hub groove when the sleeve is in the expanded position.

7. A reel as defined in claim 6 in which the spring clip has a tapered surface, and
- the hub groove having a tapered surface which mates with the spring clip tapered surface and aids the movement of the spring clip out of the hub groove.

8. A reel for holding a roll of material, the reel comprising:
- a rotatable hub,
- an expandable split sleeve mounted on the hub and movable between an expanded position and a collapsed position,
- the sleeve in its expanded position making a snug fit with a roll of material and in its collapsed position making a loose fit with the roll of material so the roll can be slipped off the sleeve,
- the hub having the shape of a truncated cone and having an outwardly extending flange,
- the sleeve having a tapered opening mating in part with the hub and in part mating with the hub flange,
- the sleeve having a step formed in the tapered opening aligned with the hub flange to prevent removal of the sleeve from the hub and to hold the sleeve in its collapsed position, and
- a split spring clip having a tapered surface,
- the sleeve having a groove formed in its tapered opening with the spring clip extending therein, the hub having a tapered locking groove mating with the spring clip tapered surface and the spring clip engaging the hub groove when the sleeve is in the expanded position and serving to hold the sleeve in the expanded position.

9. A reel as defined in claim 8 in which the sleeve has an axis and the sleeve tapered surface is disposed at an angle of 5° with respect to the axis.

References Cited by the Examiner

UNITED STATES PATENTS

| | | | |
|---|---|---|---|
| 2,733,873 | 2/1956 | Patersen | 242—72.1 |
| 3,124,319 | 3/1964 | Cohen et al. | 242—68.3 |

MERVIN STEIN, *Primary Examiner.*

N. L. MINTZ, *Assistant Examiner.*